US011929459B2

(12) United States Patent
Jonson et al.

(10) Patent No.: US 11,929,459 B2
(45) Date of Patent: Mar. 12, 2024

(54) BINDER SYSTEMS AND METHODS FOR TAPE CASTING LITHIUM GARNET ELECTROLYTES

(71) Applicant: THE REGENTS OF THE UNIVERSITY OF CALIFORNIA, Oakland, CA (US)

(72) Inventors: Robert Jonson, Berkeley, CA (US); Michael Tucker, Piedmont, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 192 days.

(21) Appl. No.: 17/480,855

(22) Filed: Sep. 21, 2021

(65) Prior Publication Data

US 2022/0093960 A1    Mar. 24, 2022

Related U.S. Application Data

(60) Provisional application No. 63/081,176, filed on Sep. 21, 2020.

(51) Int. Cl.
*H01M 10/056* (2010.01)
*H01M 10/052* (2010.01)
*H01M 10/058* (2010.01)

(52) U.S. Cl.
CPC ....... *H01M 10/056* (2013.01); *H01M 10/052* (2013.01); *H01M 10/058* (2013.01);
(Continued)

(58) Field of Classification Search
CPC .......... H01M 10/0562; H01M 10/052; H01M 10/056; H01M 10/058
See application file for complete search history.

(56) References Cited

U.S. PATENT DOCUMENTS

2018/0301754 A1* 10/2018 Badding ............... C04B 35/488
2020/0153037 A1*  5/2020 Renna ..................... B01J 6/008

OTHER PUBLICATIONS

Chen, Fei et al., "The Tape-Casting and PAS Sintering of LLZO Ceramic Membrane Electrolyte", Proceedings of the 42nd International Conference on Advanced Ceramics and Composites: Ceramic Engineering and Science Proceedings, vol. 39, Issue 2, 2019, pp. 1-10.

(Continued)

*Primary Examiner* — Sarah A. Slifka
(74) *Attorney, Agent, or Firm* — O'BANION & RITCHEY LLP; John P. O'Banion (57) ABSTRACT

Slurry compositions, tape casting binder systems and fabrication methods for the fabrication of lithium-garnet electrolyte scaffolds for use in solid state batteries and other devices are provided. Slurry compositions may be optimized mixtures of LLZO powder, a dispersant, a lithium salt, a wetting agent a binder, a plasticizer and at least one solvent. The optimized ceramic slurry compositions may include MgO as a sintering additive to improve density and ionic conductivity of the doped-LLZO sheets and produce a fine-grained microstructure. Sintering protocols for cast slurries of commercially available doped LLZO powders eliminate the requirement of mother-powder coverings or externally applied pressure. An environmentally friendly water-based system using methylcellulose as a binder is also provided producing green tape and final properties comparable to those obtained with organic solvent-based systems.

14 Claims, 4 Drawing Sheets

(52) U.S. Cl.
CPC .......... *H01M 2300/002* (2013.01); *H01M 2300/0088* (2013.01)

(56) References Cited

OTHER PUBLICATIONS

Fu Kun, et al., "Three-dimensional bilayer garnet solid electrolyte based high energy density lithium metal-sulfur batteries", Energy Environment Science, vol. 10, 2017, pp. 1568-1575.

Hamann, Tanner et al., "The Effects of Constriction Factor and Geometric Tortuosity on Li-Ion Transport in Porous Solid-State Li-Ion Electrolytes", Advanced Functional Materials, 2020, pp. 1-15.

Hanc, Emil et al., "On fabrication procedures of Li-ion conducting garnets", Journal of Solid State Chemistry 248, 2017, pp. 51-60.

Hitz, Gregory et al., "High-rate lithium cycling in a scalable trilayer Li-garnet-electrolyte architecture", Materials Today, vol. 22, Jan./Feb. 2019, pp. 50-57.

Jonson, Robert A. et al., "Tape casting and sintering of Li1La3Zr1.75Nb0.25Al0.1O12 with Li3BO3", Solid State Ionics, 323, 2018, pp. 49-55.

Shen, Hao et al., "Scalable Freezer-Tape-Casting Fabrication and Pore Structure Analysis of 3D LLZO Solid-State Electrolytes", Applied Materials & Interfaces, 2020, pp. 3494-3501.

Yi, Eongyu et al., "All-Solid-State Batteries Using Rationally Designed Garnet Electrolyte Frameworks", Applied Materials & Interfaces, 2020, pp. 170-175.

Yi, Eongyu et al., "Frame made nanoparticles permit processing of dense, flexible, Li conducting ceramic electrolyte thin films of cubic-Li7La3Zr2O12 (c-LLZO)", Journal of Materials Chemistry A, vol. 4, 2016, pp. 12947-12954.

Yi, Eongyu et al., "Key parameters governing the densification of cubic-Li7La3Zr2O12 Li conductors", Journal of Power Sources, vol. 352, 2017, pp. 156-164.

Ruijie, Ye et al., "Water-based fabrication of garnet-based solid electrolyte separators for solid-state lithium batteries", Green Chemistry, the Royal Society of Chemistry 2020, DOI: 10.1039/d0gc01009j, Jun. 16, 2020, pp. 1-10.

Rosen, Melanie et al., Royal Society of Chemistry, J. Mater. Chem. A, 9, 4831, 2021, pp. 4831-4840.

Gao, Kangning et al., "Preparation of high-density garnet thin sheet electrolytes for all-solid-state Li-Metal batteries by tape-casting technique", Journal of Alloys and Compounds, 791, 2019, pp. 923-928.

\* cited by examiner

BINDER SYSTEMS AND METHODS FOR TAPE CASTING LITHIUM GARNET ELECTROLYTES

CROSS-REFERENCE TO RELATED APPLICATIONS

This application claims priority to, and the benefit of, U.S. provisional patent application Ser. No. 63/081,176 filed on Sep. 21, 2020, incorporated herein by reference in its entirety.

STATEMENT REGARDING FEDERALLY SPONSORED RESEARCH OR DEVELOPMENT

This invention was made with government support under Contract No. DE-AC02-05CH11231, awarded by the U.S. Department of Energy. The Government has certain rights in the invention.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

This technology pertains generally to tape casting systems and methods and more particularly to lithium garnet electrolyte slurry compositions and optimized systems and methods for the fabrication of thin tapes and electrolyte layers for solid state battery applications.

2. Background

The lithium-garnet electrolyte, $Li_7La_3Zr_2O_{12}$ (LLZO), has attracted considerable attention as an electrolyte material available for safer next-generation solid-state lithium batteries due to its combination of high ionic conductivity (up to $10^{-3}$ S/cm at room temperature, depending on dopants), apparent stability against metallic lithium, and wide electrochemical stability window. While these LLZO's properties are appealing, it is a difficult material to process with scalable techniques. Tape casting, for example, is an attractive technology for the scalable manufacturing of thin lithium garnet electrolyte (LLZO) layers for solid state battery applications. However, processing of LLZO is complicated by many factors including lithium volatilization, abnormal grain growth, and phase instability, which are exacerbated by high surface area to volume ratios. Accordingly, sintering of LLZO ceramics to high density while controlling Li content is a challenge.

The high bulk ionic conductivity of LLZO is dependent on obtaining the cubic polymorph of the material rather than the tetragonal phase, for which ionic conductivity is over 2 orders of magnitude lower. The cubic phase is typically stabilized through aliovalent substitution with the most common being Al or Ga for Li or Ta or Nb for Zr. These elements stabilize the cubic phase and improve conductivity via the creation of vacancies and disorder in lithium-site populations.

Controlling lithium content in LLZO can be seen as critical for obtaining high performance electrolytes. Control of the Li content is, however, complicated by lithium evaporation from LLZO at the 1000° C. to 1250° C. sintering temperature that is required to achieve high density. Because of Li evaporation, nonconductive impurity phases such as $La_2Zr_2O_7$ are easily formed. Common strategies to mitigate Li loss involve adding excess Li, often in the form of $Li_2CO_3$, and/or burying samples in a sacrificial mother LLZO powder. Since covering with sacrificial mother powder is not expected to be a viable solution on a manufacturing scale, other options must be developed. The addition of excess lithium to the green part requires an optimization of sintering temperatures and times and $Li_2CO_3$ content that depends on sample volume and surface area, among other considerations. This means that optimization done with pelletized samples will not apply directly to thin tape cast sheets.

Furthermore, even when cubic LLZO is obtained, it is sensitive to a surplus of Li. For example, Ga-LLZO suffers a 20% drop in conductivity from a peak of $1.1 \times 10^{-3}$ S/cm as lithium concentration increases from 6.55 to 6.79 per formula unit. Reducing sintering temperature and/or sintering time may also reduce the required excess lithium content.

Sintering aids have been identified for LLZO, with various mechanisms of densification enhancement. For example, $Al_2O_3$ forms a eutectic liquid phase with $LiO_2$ at 1055° C., which promotes particle rearrangement and aids in diffusion. The MgO has been shown to inhibit grain growth, resulting in a higher density and more uniform microstructure. It has been reported that the addition of greater than 5 wt % MgO to Ta-substituted LLZO controlled abnormal grain growth (AGG), increased fracture strength by 50%, and achieved high density comparable to hot pressing (98%). However, conductivity was reduced moderately from 6.7 to $5.8 \times 10^{-4}$ S/cm.

Tape casting is one of the most widely used methods for producing thin ceramic sheets in a continuous process. A typical tape casting process proceeds in several stages. First, ceramic powder is ball milled in a solvent containing a dispersant to break apart agglomerates and produce a stable suspension. Next, binder and plasticizers are added and mixed for a period of time. Finally, the slurry is cast with a doctor blade onto a carrier sheet to produce a tape with uniform height. Selection of the solvent, dispersant, binder, other additives, and their ratios depends on the physical and chemical properties of the ceramic powder to be cast and the desired properties of the green tape.

There is a need for optimization of the electrolyte tape slurry process including the selection of slurry components and green density of tapes, tape casting binder/solvent systems and powder properties such as particle size distribution and surface area. The role of slurry formulation and sintering additives and sintering protocols on the fabrication of dense, thin tape cast LLZO sheets is also in need of optimization.

BRIEF SUMMARY

Lithium garnet electrolytes in the form of thin LLZO sheets are appealing materials for use in solid state battery applications. However, $Li_7La_3Zr_2O_7$ (LLZO) powder is highly reactive and is not compatible with some common tape casting binder systems. This is most apparent in aqueous systems using poly(vinyl alcohol) where the slurry immediately gels and becomes unusable. Poly(vinyl butyral) may demonstrate similar behavior with some solvent mixtures. Additionally, the MgO sintering aid that is preferably used with LLZO is slightly soluble in water and will react with and cause flocculation when it is used with some common dispersant compounds in the poly(acrylic acid) family, including Darvan C, some grades of Dispex, and high molecular weight poly(acrylic acid).

To overcome these limitations, several tape casting systems were developed for use with Al-LLZO and other doped electrolytes (e.g., Ga, Ta, or Nb doped LLZO). Both aqueous and solvent-based binder systems were shown to be capable of producing high density sintered Al-LLZO, after careful optimization of additives and slurry recipes. The tape casting slurry systems were screened, and selected candidate systems were optimized to produce high green oxide-only density (GOOD). The impact of this optimization on mechanical properties of the green tape and final density of the sintered Al-LLZO sheet were also examined since green tape properties may be very important to manufacturability considerations such as uniformity, defect concentration, lamination processing, and handling strength.

Generally, the methods cast LLZO slurries produced using a two-step slurry mixing procedure. First, ceramic powders, a dispersant, and a solvent are milled with $ZrO_2$ media for 12 hours to 24 hours. Second, binder, plasticizer, and other additives were added and milled for an additional 8 hours before being cast on silicone-coated mylar carrier films, for example.

Several sintering protocols for commercially available $Li_{6.25}Al_{0.25}La_3Zr_2O_{12}$ (Al-LLZO) powder were also developed that requires no mother-powder covering or externally applied pressure. MgO was also evaluated as a sintering additive to improve density and ionic conductivity in the Al-LLZO sheets and to produce a fine-grained microstructure. The produced Al-LLZO sheets containing 5 wt % MgO had densities of >90% and ionic conductivity of greater than $2\times10^{-4}$ S/cm. The optimized ceramic composition and sintering protocol were used to compare several tape casting binder systems. An environmentally friendly and nontoxic water-based system using methylcellulose as a binder was developed with green and final properties comparable to those obtained with solvent-based systems.

Optimization of sintering time and MgO content in Al-LLZO sheets identified a trade-off between ionic conductivity and density. Produced Al-LLZO sheets with 3% MgO were shown to be approximately 88% dense with greater than $4\times10^{-4}$ S/cm conductivity while sheets with 5 wt % MgO were approximately 91% dense with a conductivity of between 2 and $3\times10^{-4}$ S/cm. Through a comparison of the phase stability of tape cast sheets and pelletized samples, the importance of Li content optimization on the final properties of an Al-LLZO film was also demonstrated.

In the construction of the bucket of this invention, The tape casting binder/solvent systems with optimized sintering can be adapted to produce a wide range of tape usability, as-cast density, and mechanical properties. Of the tested binders, for example, methylcellulose can be recommended for being environmentally friendly and as presenting fewer health and safety issues while the MSB1-13™ binder can be recommended for superior green mechanical properties.

According to one aspect of the technology, optimized electrolyte slurry compositions and sintering protocols are provided that are industrially scalable, predictable and can be readily formed into bi-layer and tri-layer structures for solid state lithium battery applications.

Another aspect of the technology is to provide fabrication methods that use either aqueous or organic solvents with a variety of dispersants and binders with a two-step slurry forming process and to permit control over certain green tape characteristics.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWINGS

The technology described herein will be more fully understood by reference to the following drawings which are for illustrative purposes only.

DETAILED DESCRIPTION

Referring more specifically to the drawings, for illustrative purposes, systems and methods for the fabrication of doped lithium-garnet electrolyte film or tape structures and laminate structures are generally shown. Several embodiments of the technology are described generally in FIG. 1 to FIG. 3 to illustrate the characteristics and functionality of the devices, compositions and fabrication methods. It will be appreciated that the methods may vary as to the specific steps and sequence and the systems and apparatus may vary as to structural details without departing from the basic concepts as disclosed herein. The method steps are merely exemplary of the order that these steps may occur. The steps may occur in any order that is desired, such that it still performs the goals of the claimed technology.

Tape casting is an attractive technology for the scalable manufacturing of thin lithium garnet electrolyte (LLZO) layers for solid state battery applications. However, the processing of LLZO is complicated by many factors including lithium volatilization, abnormal grain growth, and phase instability, which are exacerbated by high surface area to volume ratios. Both aqueous and solvent-based binder systems with carefully optimized additives and slurry recipes and sintering protocols are provided that produce high density doped-LLZO electrolyte structures that overcome these complications.

Sintering protocols for commercially available $Li_{6.25}Al_{0.25}La_3Zr_2O_{12}$ (Al-LLZO) powder that requires no mother-powder covering or externally applied pressure are used to illustrate the compositions and methods. MgO may be used as a sintering additive to improve the density and ionic conductivity of the Al-LLZO sheets and produce a fine-grained microstructure. Al-LLZO sheets with 5 wt % MgO had densities of >90% and ionic conductivity greater than $2 \times 10^{-4}$ S/cm.

Figure 1:
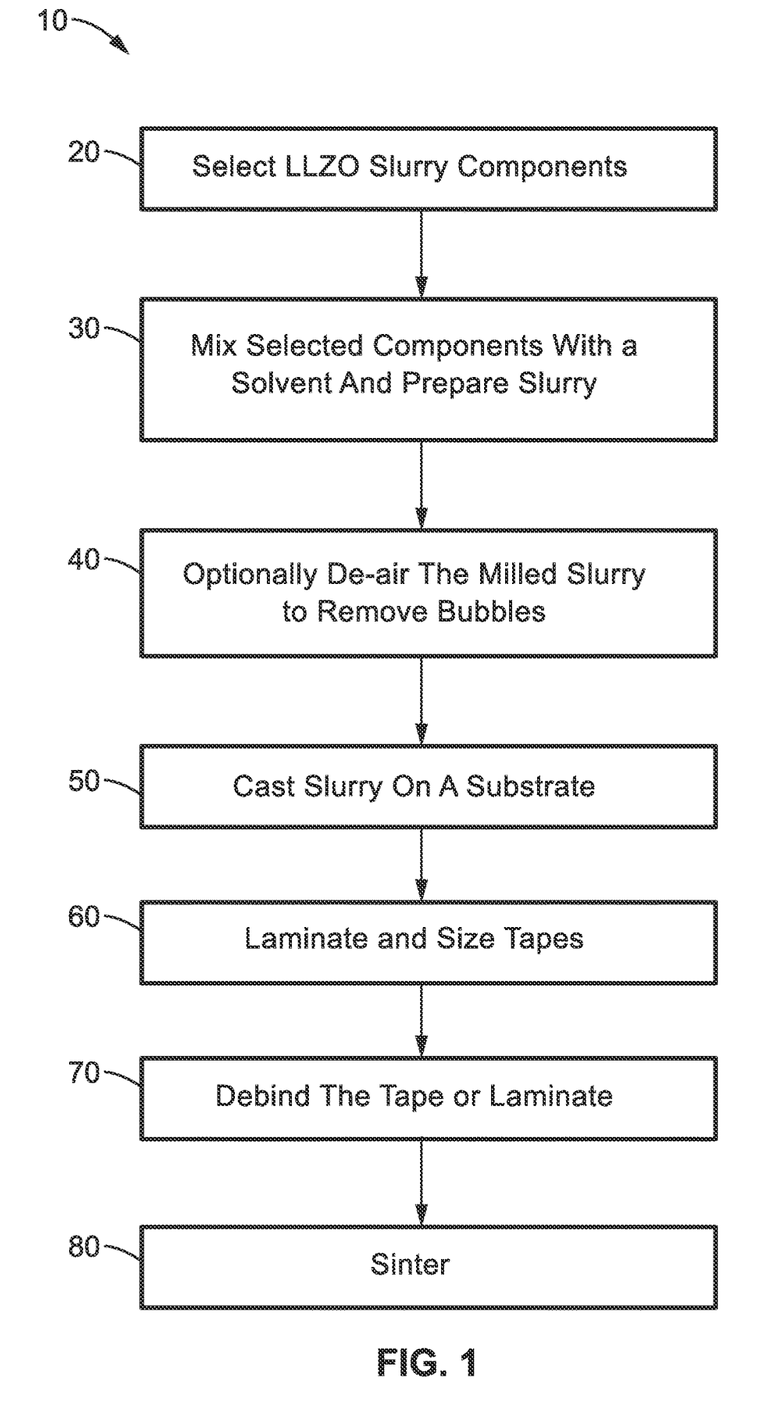
FIG. 1 is a functional block diagram of a method for fabricating thin lithium garnet electrolyte layers or tapes according to one embodiment of the technology.

Turning now to FIG. 1, one method 10 for fabricating lithium garnet electrolyte tapes or laminates with improved densities, ionic conductivity and lithium content is generally shown. The configuration of the slurry compositions, casting and sintering protocols can be optimized for higher performance and uniform tape microstructure.

At block 20 of the method of FIG. 1, the LLZO slurry components for tape casting tapes or layers with desired sheet properties are selected. Generally, the slurry composition comprises a LLZO powder, a binder, at least one solvent, a dispersant and a plasticizer. The preferred slurry composition also includes a lithium additive and a MgO additive to inhibit grain growth resulting in a higher density and more uniform microstructure.

The selection of the solvent, dispersant, binder, plasticizer, other additives, and their ratios depends on the physical and chemical properties of the ceramic powder to be cast and the desired properties of the green tape. The selection of individual components may also be dependent on their chemical compatibility with other selected components.

The LLZO material that is selected at block 20 is preferably doped with Al, Ga, Ta or Nb. The methods and tapes are illustrated with Al-LLZO. The doped LLZO powder can also be selected for optimum powder morphology (e.g., finer particles, bimodal particle size distribution, or surface treatments).

The preferred binders that are selected at block 20 may include, for example, poly(vinyl alcohol), PVB, polyacrylic resins, WB4101™, ethylcellulose, MSB1-13™, xanthan gum, latex, polymethyl methacrylate and methylcellulose. Binders assist in the slurry casting and binding of the LLZO particles.

Solvents are selected based on their ability to solvate the components and form a suitable slurry for casting. Suitable solvents are typically aqueous or organic liquids such as toluene, acetone, ethanol, isopropanol, ethylene glycol. Mixtures such as water/ethanol or ethanol/toluene and others may also be suitable solvents selected at block 20. The selection of binders and solvents may depend on compatibility. For example, a non-toxic, water-based system using methylcellulose as a binder was developed with green tape and final properties comparable to those obtained with solvent-based systems.

Dispersants that are selected at block 20 may be influenced by the solvent selection and other components. Preferred dispersants include Menhaden Fish Oil, DS002™, Poly(acrylic acid), Dispex Ultra PA 4560™ Hypermer KD6™ Hypermer KD7™, ammonium polymethacrylate and phosphite ester-based dispersants. Dispex Ultra PA 4560™, Menhaden fish oil, and phosphite ester-based dispersants were all found to be particularly compatible with both LLZO and MgO and these are preferred.

The preferred optional plasticizers for the slurry selected at block 20 include polyethylene glycol (PEG 400 and PEG 300) glycerine, propylene carbonate dibutyl phthalate and benzyl butyl phthalate. Although these plasticizers are preferred, other plasticizers may be used.

Additionally, the slurry may also include optional defoamers such as DF002™ and vacuum de-airing before casting to prevent pinholes. Wetting agents such as Dynol 604™ may also be added at block 20 to prevent dewetting and beading on the carrier film substrate to improve the preparation of the LLZO slurry and final tape.

The selected LLZO slurry components at block 20 are mixed and the slurry is prepared at block 30 of FIG. 1. Generally, the LLZO slurry is preferably prepared with a two-step slurry mixing procedure. In the first step, the ceramic powders, dispersant, and solvent are milled with $ZrO_2$ media for 12 hours to 24 hours. In one embodiment, the selected dispersant, wetting agent, defoamer, $ZrO_2$ media and solvent are combined and mixed until dissolved. The $LiCO_3$, MgO and Al-LLZO powders are added to that combination and ball milled.

In the second step, the selected binder, plasticizer, and other additives are added and milled for an additional 8 hours to 24 hours before being prepared to cast.

The resulting milled LLZO slurry may be optionally de-aired at block 40 to remove bubbles or voids in the slurry that can produce pinholes or similar defects in the cast tape. In one embodiment, the remaining ball media in the slurry is removed and the slurry is transferred to a different container. The container is first placed into a centrifugal mixer for a period of time, typically less than a minute, and then placed into a vacuum chamber to further de-air and remove any remaining bubbles.

The de-aired slurry is ready to be tape cast onto a substrate using one of a variety of casting methods at block 50.

Casting at block 50 refers generally to a process of delivering and transferring the prepared LLZO slurry onto a substrate such that the slurry forms into a film. Casting may be accomplished by tape casting or slip casting processes or other film forming methods known in the art.

Tape casting processes, for example, can produce tapes of substantially uniform thicknesses. The tapes cast at block 50 can be produced as individual tapes or formed into laminates. At block 60, the tapes or films that are produced can be trimmed and sized individually. If multiple castings are made to produce a laminate, the laminate may be sized at block 60. Multiple individual tape casts can also be assembled and fused into a laminate structure.

The green tapes or laminates that are produced at block 60 are then sandwiched between two plates, such as $Al_2O_3$ plates, to prevent curling during de-binding at block 70. The plates and tapes are heated to remove the binder from the tape or laminate. In one embodiment, the tapes are placed into a box furnace and brought to a temperature of 650° C. with a ramp rate of about 2° C./min. The tapes are heated at this peak temperature for approximately 2 hours to remove the binder from the tape or laminate structure.

Finally, at block 80, the tapes or laminates are sintered to densify and strengthen the final tape structure. In one embodiment, after the binder and any remaining volatiles are removed at block 70, the tapes or laminates are placed between two pyrolytic graphite sheets that are in turn placed between two ceramic plates, preferably $Al_2O_3$ plates and loaded into a furnace.

The tapes are sintered at block 80 in a temperature of between approximately 1000° C. and approximately 1150° C. for a period of between about 2 hours and about 7 hours, preferably in an Argon atmosphere. A ramp rate of 5° C./min or less is typical. Sintering times at block 80 can also be optimized and adjusted to produce the greatest density, lithium content and ionic conductivity in the final tapes.

The technology described herein may be better understood with reference to the accompanying examples, which are intended for purposes of illustration only and should not be construed as in any sense limiting the scope of the technology described herein as defined in the claims appended hereto.

Example 1

In order to demonstrate the functionality of the methods and compositions, several Al-LLZO tape casting slurries with different formulations were prepared according to the methods and the resulting tapes were evaluated. Slurry formulations with different dispersants and binders and MgO content were prepared.

$ZrO_2$ balls with a 2 mm diameter (Inframat) were used as milling media. A 5 mL portion of each slurry was pipetted into a graduated test tube and sealed. The dispersions were allowed to settle for 2 weeks for evaluation. A shorter, and thus denser, packed bed height after settling indicates a better quality of dispersant.

All tape slurries were mixed in a two-stage process. In the first stage, the Al-LLZO, $Li_2CO_3$, and MgO materials were milled overnight with the corresponding solvent, dispersant, and other additives using $ZrO_2$ media to produce a ceramic dispersion. All tapes contained 5 wt % of additional $Li_2CO_3$, which corresponds to about 19.2 wt % of excess Li.

In the second stage, the binder and plasticizers were added to the mixture and milled overnight again. The following lists the binder systems and their specific additives.

The Methylcellulose methylcellulose slurry was composed of ceramic (38.5 wt %); water (41.5 wt %); ethanol (13.3 wt %); Dispex™ (2.7 wt %); Dynol™ (0.9 wt %); DF002™ (0.2 wt %); methylcellulose (1.7 wt %); and PEG (1.2 wt %).

The methylcellulose-low binder slurry was composed of ceramic (38.7 wt %); water (41.7 wt %); ethanol (13.2 wt %); Dispex™ (2.7 wt %); Dynol™ (0.9 wt %); DF002™ (0.3 wt %); methylcellulose (1.4 wt %); and PEG (1.0 wt %).

The ethylcellulose slurry was composed of ceramic (40.1 wt %); toluene (41.2 wt %); ethanol (13.6 wt %); DS002™ (0.9 wt %); ethylcellulose (2.4 wt %); and PEG (1.8 wt %).

The PVB slurry was composed of ceramic (41.7 wt %); acetone (25.4 wt %); ethanol (25.4 wt %); PVB (3.78 wt %); and BBP (3.78 wt %).

The MSB1-13™ slurry was composed of ceramic (37.9 wt %); toluene (36.9 wt %); DS002™ (0.8 wt %); and MSB1-13™ (24.4 wt %).

The MSB1-13™ low binder slurry was composed of ceramic (45.6 wt %); toluene (40.1 wt %); DS002™ (1.0 wt %); and MSB1-13™ (13.3 wt %).

Following mixing, the slurries were de-aired under a vacuum for 10 minutes. Tapes were cast onto a silicone-coated polyethylene terephthalate (SiPET) carrier film with an automatic doctor blade coater (MTI Corporation). The doctor blade gap was set to 200 µm. Films were dried overnight under ambient conditions.

The cast tapes were removed from the carrier film and cut into squares approximately 4.5 cm in width. Four squares were stacked between SiPET sheets and laminated together at pressures ranging from 10 MPa to 35 MPa and temperatures ranging from between 100° C. and 150° C. for 15 minutes. These laminates were then subdivided into squares that were approximately 2 cm in width.

The tape laminate sheets were then de-binded at 700° C. in air for 2 hours with a ramp rate of 2° C./min. Laminate sheets were sintered between pyrolytic graphite sheets (Panasonic) in order to prevent interactions with the top and bottom $Al_2O_3$ setter plates that were used to mitigate warping.

Sintering was performed in a tube furnace (MTI) under a flowing Ar atmosphere at 1115° C. for a range of times between 2 hours and 5 hours. The inert Ar atmosphere prevented both the oxidation of the graphite sheets and the formation of $Li_2CO_3$ on the Al-LLZO part during cooling. Sintering temperatures were selected on the basis of dilatometry data which indicated an onset of sintering for MgO-containing Al-LLZO at a temperature of approximately 1115° C.

Example 2

The Al-LLZO sintering process is sensitive to Li volatilization and sintering additives. To determine the effects of tape casting binder systems on the final properties of Al-LLZO sheets, it is important to have an optimized sintering protocol and ceramic composition.

Optimization of MgO content and sintering time for Al-LLZO laminate sheets was performed by examining the density and ionic conductivity of sheets sintered with a range of MgO contents between 0 wt % and 7 wt % at 1115° C. for from about 2 hours to about 5 hours. All of the sheets contained 5 wt % $Li_2CO_3$ for mitigation of Li evaporation during sintering. These tape laminates were made with the methylcellulose binder system identified in Example 1. Sintered sheets were approximately 1.5 cm on edge and 100 µm thick for a surface area to volume ratio of approximately 150 $cm^{-1}$.

Ionic conductivity was shown to reach a maximum of $4.35 \times 10^{-4}$ S/cm for sheets with 3 wt % MgO sintered for 3 hours, an increase of nearly 50% from sheets without any MgO under the same sintering conditions. Increasing the MgO content beyond 3 wt % at 3 hours of sintering time reduced conductivity while the 7 wt % MgO sheets displayed less than $1 \times 10^{-4}$ S/cm. Ionic conductivity was reduced for all samples with 4 hours of sintering time compared to 3 hours, but a similar trend in conductivity was observed with 3 wt % MgO having the highest conductivity and additional MgO being detrimental.

Sintering for 2 hours produced less than $1 \times 10^{-4}$ S/cm conductivity in all MgO contents. Ionic conductivity and density were not shown to be strongly correlated. Densities of sheets sintered without MgO increased with longer sintering times, improving from approximately 85% with 2 hours of sintering to about 91% at 4 hours. Density for sheets containing MgO did not follow this trend and was highly variable. At 3 hours of sintering time, 5 wt % and 7 wt % MgO improved density over 0 wt % MgO by 3 percentage points to approximately 91%.

The 3 wt % MgO sheets sintered for 3 hours, which displayed the highest conductivity, were less dense than the others by 1 to 4 percentage points. These trends suggest that an engineering trade-off may be required between ionic conductivity and density.

Phase analysis provided further insight into the density and conductivity trends. Phase analysis of selected approximately 100 µm thick Al-LLZO sheets are seen in the XRD patterns shown in FIG. 2A to FIG. 2D at sintering times of 2 hours, 3 hours and 4 hours.

Figure 2A:
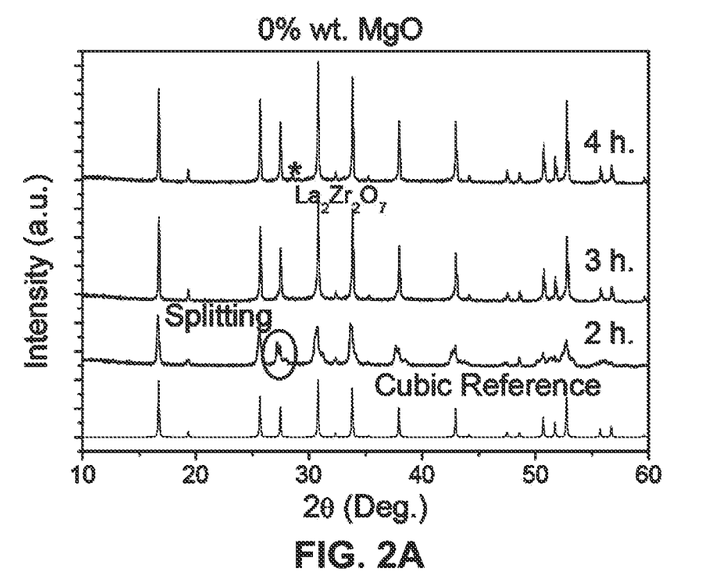
FIG. 2A is a graph depicting XRD patterns of ~100 pm thick Al-LLZO sheets sintered at 2, 3 and 4 hours with 0 wt % MgO.
Figure 2B:
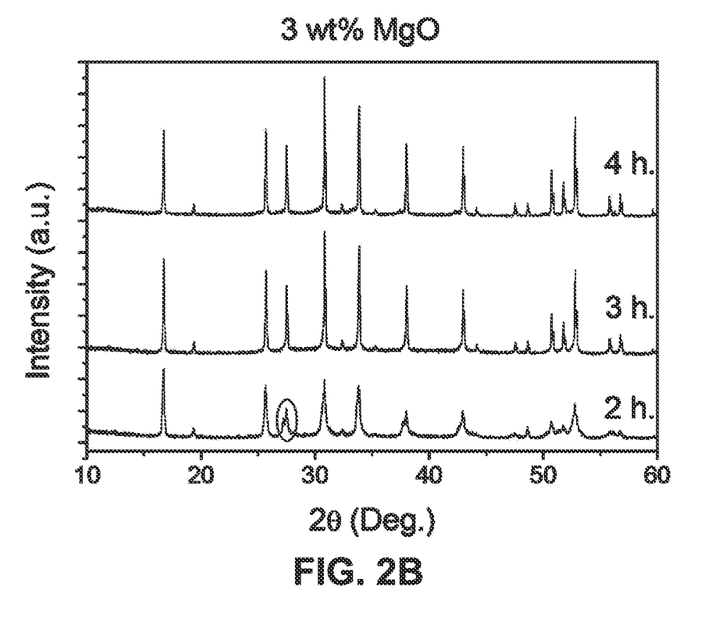
FIG. 2B is a graph depicting XRD patterns of ~100 μm thick Al-LLZO sheets sintered at 2, 3 and 4 hours with 3 wt % MgO.
Figure 2C:
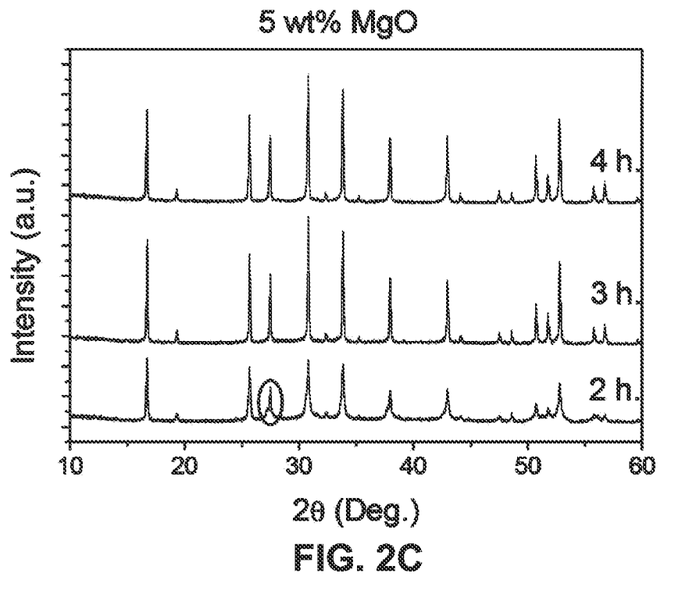
FIG. 2C is a graph depicting XRD patterns of ~100 μm thick Al-LLZO sheets sintered at 2, 3 and 4 hours with 5 wt % MgO.
Figure 2D:
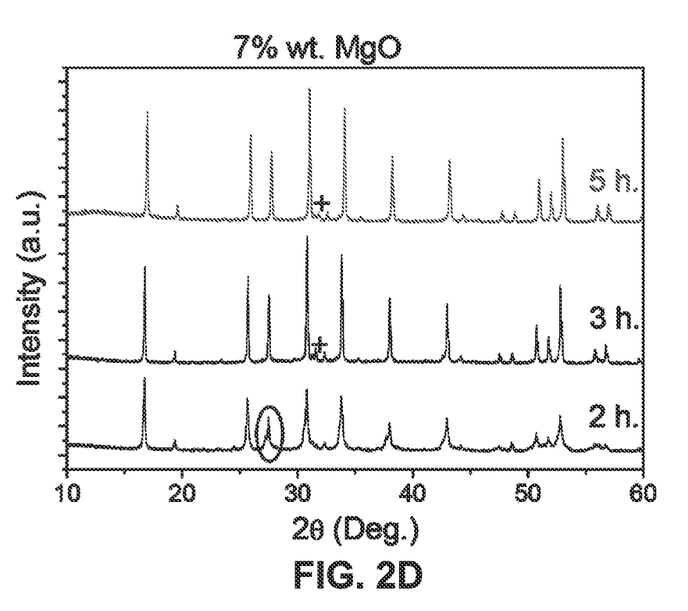
FIG. 2D is a graph depicting XRD patterns of ~100 μm thick Al-LLZO sheets sintered at 2, 3 and 5 hours with 7 wt % MgO.

The Al-LLZO sheets of FIG. 2A have 0 wt % MgO for comparison with tapes with 3 wt % MgO shown in FIG. 2B and 5 wt % MgO shown in FIG. 2C, and 7 wt % MgO shown in FIG. 2D. A reference pattern for cubic LLZO is provided in FIG. 2A. In FIG. 2A through FIG. 2D, the presence of $La_2Zr_2O_7$ is identified by an * in the figures. Peak splitting from tetragonal LLZO is circled. The unidentified impurity peaks are marked by a + in the figure. The peak shift observed in the 5 hours sintered 7 wt % MgO sample is an artifact produced by a sample holder that was at a different height.

As described above, all of the samples sintered for 2 hours, regardless of MgO content demonstrated poor ionic conductivity. This is because these sheets contain the low ionic conductivity tetragonal LLZO phase, indicated by XRD peak splitting. The tetragonal phase arises from excess Li present in the garnet structure after sintering. Longer sintering times are expected to enhance Li evaporation and thereby promote transition to the cubic phase.

All samples sintered for 3 hours or longer were observed to have a cubic configuration. Excess Li loss also resulted in a reduction in conductivity. The presence of $La_2Zr_2O_7$ is an indicator of Li deficiency, and this may partially explain the reduced conductivity of the 4 hours sintered samples, even though their density is within the same range as the 3-hour samples. A low-intensity $La_2Zr_2O_7$ peak is observed at 28.5° in the 4-hour sintered sheet with 0 wt % MgO. This small peak is not visible in any of the samples containing MgO at either 4 hours or 5 hours.

Unidentified impurity peaks are observed at 31.3° and 31.6° in the case of high MgO content (7 wt %) sheets sintered for 3 hours and 5 hours. This suggested that MgO is not chemically inert, and interacts with Al-LLZO, which may account for the reduced ionic conductivity of the 5 wt % and 7 wt % MgO sheets and the lack of observed $La_2Zr_2O_7$ in these samples at longer sintering times. The lattice parameters calculated for the sheets appear to change little over the range of MgO content which does not provide conclusive evidence as to whether Mg is or is not being doped into the LLZO.

Finer-grained structures are promoted by the addition of MgO and these structures are expected to be advantageous for battery applications because of their increased toughness. SEM imaging displayed the microstructural effects of adding MgO to the slurry formulation for the cast Al-LLZO sheets. The Al-LLZO sheets with 0 wt % MgO did not have any discernible grain boundaries but did contain large (>2 µm) intragranular pores which are indicative of AGG. The addition of at least 3 wt % MgO inhibited grain growth and produced reduced grain size (<5 µm) and smaller pores (<1 µm) concentrated at the grain boundaries. Additional MgO (5 wt %) did not appear to further impact microstructure under these conditions. On the basis of these observations, 5 wt % MgO and 5 wt % $Li_2CO_3$ sintered for 3 hours were used for evaluation of the tape casting process, described below, because they had the highest density in addition to a fine-grained microstructure and ionic conductivity, greater than about $2\times10^{-4}$ S/cm.

Example 3

To demonstrate the importance of Li content optimization on an Al-LLZO tape or laminate, pelletized samples were prepared and the phase stability of tape cast sheets and the pelletized samples were compared. Initially, Al-LLZO pellet samples with 0, 3, 5 and 7 wt. % MgO and 3 wt % $Li_2CO_3$ were made as a low surface area specimen geometry for comparison with tape samples. The $Li_2CO_3$ content was reduced to 3 wt % in order to compensate for the greatly reduced surface area of the pellets when compared to the tape laminates.

To produce pellets, Al-LLZO, MgO and $Li_2CO_3$ materials were milled overnight in isopropyl alcohol with $ZrO_2$ media. The resulting milled powder was dried and pressed in a ¼ inch pellet die at 400 MPa. The pellets were sintered in a tube furnace for 7 hours at 1115° C. under flowing argon using pyrolytic graphite sheets as substrates.

Figure 3:
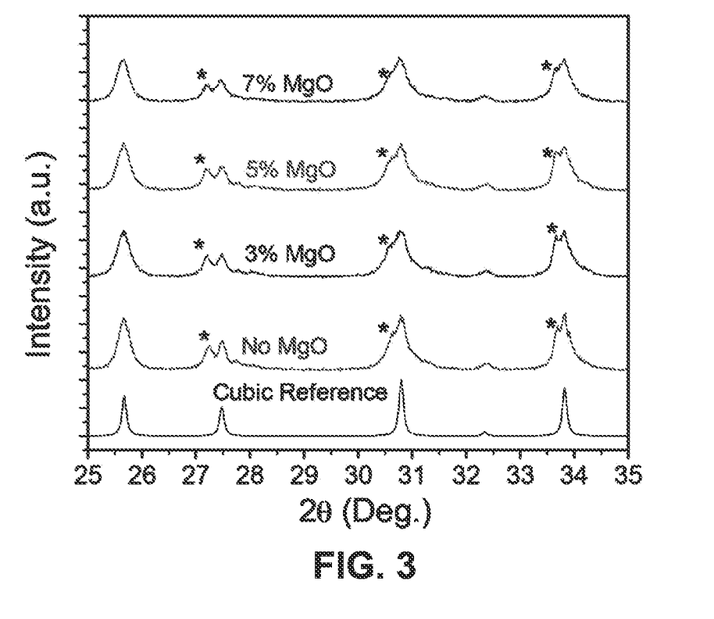
FIG. 3 is a graph depicting XRD patterns of Al-LLZO pellets with 3 wt % $Li_2CO_3$ sintered at 1115° C. for 7 h with 0 wt %, 3 wt %, 5 wt %, and 7 wt % MgO, demonstrating decreased Li evaporation in pellets with a reduced surface area to volume ratio. Peaks from the Li-rich tetragonal phase are identified with an * symbol.

Pellet samples were produced as an attempt to clarify the detrimental effect of MgO content above 5 wt % on ionic conductivity demonstrated in the Al-LLZO sheets. Additionally, they served as a demonstration of the significance of sample geometry to Li evaporation and resulting sintered Al-LLZO properties. Reduced surface area to volume ratios for pellets (14 $cm^{-1}$ vs 150 $cm^{-1}$ for sheets) is expected to reduce Li evaporation during sintering. Therefore, the $Li_2CO_3$ content was reduced from 5 wt % to 3 wt % for pellets, and sintering times were increased to 7 hours at 1115° C. These measures were insufficient to offset the reduced surface area, and all pellet samples produced contained tetragonal LLZO and had ionic conductivities of less than $4\times10^{-5}$ S/cm as shown in FIG. 3.

Pellet densities were between 88% and 89% of theoretical over a wide range of MgO contents (0 to 7 wt %). The amount of MgO did not appear to have a significant effect on phases present, ionic conductivity, or density. The microstructural effects of the MgO were also limited by the longer sintering times and reduced Li evaporation. Only 7 wt % MgO pellets remained fine grained (<5 µm). Course grained microstructures with grains greater than 100 µm and intragranular porosity indicative of AGG were observed in pellets with up to 5 wt % MgO. This comparison of pellet and sheet properties illustrates that Li concentration, additive amounts, and sintering conditions must all be reoptimized when changing sample geometry. The amount of MgO, however, did not appear to have a significant effect on the phases, ionic conductivity or density.

Example 4

To further demonstrate the functionality of the methods and compositions, slurries with different dispersant contents were prepared and the slurries evaluated. One of the systems developed was water-based and used methylcellulose as a binder. Aqueous tape casting systems have several health and safety advantages when compared to solvent-based systems. Volatile organic solvents require special handling to mitigate fire risks, chronic exposure for workers, and environmental release, which can be avoided with aqueous systems. Aqueous systems, however, tend to be more difficult to process and optimize. The high surface energy of water can lead to tapes dewetting from the carrier films. Water also interacts with ceramic powders more readily than most solvents, leading to dissolution and double layer effects, which can have an impact on slurry dispersion.

Dispersant content in the tape casting slurries was screened and optimized through settling experiments. Al-LLZO powder ($Li_{6.25}Al_{0.25}La_3Zr_2O_{12}$, 500 nm, MSE Supplies) with MgO (50 nm, US Research Nanomaterials Inc.) and $Li_2CO_3$ (Alfa Aesar) were ball milled together with solvent and the corresponding dispersant. Screened dispersants were Menhaden fish oil (Tape Casting Warehouse), DS002™ (Polymer Innovations), poly(acrylic acid), Dispex Ultra PA 4560™ (BASF), Hypermer KD6™ (Croda International) and Hypermer (Croda International). Toluene and a 75/25 water/ethanol mixture were used as solvents.

Settling of dispersed Al-LLZO particles was used as a convenient tool to screen dispersants and to optimize dispersant loadings. In a typical settling experiment with an effective dispersant, increasing dispersant loading causes a reduction in packed bed height until reaching a maximum bed density, at which point additional dispersant has no further effect. For solvent-based systems, the DS002™ behaved as expected. Optimal dispersion was obtained with 0.020 g to 0.025 g of DS002™ per gram of Al-LLZO containing 3 wt % of $Li_2CO_3$, and this loading was selected for further tape development. In contrast, Menhaden fish oil did not promote dispersion and settling at any concentration studied.

Screening dispersants for aqueous systems was inconclusive. No tested dispersant displayed the expected settling behavior within the two-week time frame. In fact, a stable dispersion was prepared with water and no additional dispersant. It may be that the Al-LLZO powder is well dispersed by electrostatic effects in aqueous environments, and the dispersion was stable indefinitely at the concentrations that were tested.

In contrast to the other dispersants, high-molecular weight poly(acrylic acid) (PAA) settled to its final height immediately upon pouring into the test tube. This indicated that PAA caused undesirable agglomeration of the Al-LLZO/ MgO/$Li_2CO_3$ slurry, allowing for very rapid settling.

Despite not having a clear impact on dispersion of Al-LLZO in water, additives were found to be critical for wetting of the slurry on the SiPET tape casting substrate. Wetting behavior of aqueous methylcellulose tapes with various additives was observed. Slurries containing both Dispex Ultra PA 4560 and Dynol 604™ wet the substrate well, while either additive alone was ineffective. When only the Dispex™ dispersant was present, the tape film broke up into droplets. When only the Dynol 604™ wetting agent was used, the tape slurry receded from the edge and pooled in a thick line. The combination of Dispex™ and Triton X-100™ prevented complete dewetting, but the tapes receded substantially at the edges and had poor yield of a usable tape area. It should be noted that uncoated PET was investigated for use as a carrier film to avoid dewetting. Aqueous tapes were observed to wet the PET substrate well, however, they bonded too strongly to the carrier and could not be removed intact.

Example 5

A wide range of aqueous and nonaqueous solvent/binder systems were selected for comparison. In order to compare the tape casting systems directly, Al-LLZO with 5 wt % $Li_2CO_3$ and 5 wt % MgO was chosen as a standard ceramic composition because it demonstrated the highest density after sintering optimization. The selected tape casting binder/solvent systems were compared with an assessment of several important processing characteristics. The water-based WB4101™ and polyvinyl acetate (PVA) systems gel immediately upon contact with Al-LLZO, rendering them unusable. These were removed from further consideration.

A viable aqueous system was then identified, using a methyl-cellulose binder. The largest challenge in producing methylcellulose tapes is the prevention of dewetting while maintaining easy release of the tape from the carrier film substrate, as discussed above. All of the solvent-based systems present some level of health and safety concern because of their volatile organic solvents. In addition, the PVB binder requires hazardous phthalate-based plasticizers. Both PVB and ethylcellulose systems produced very brittle tapes that could be difficult to handle. The MSB1-13™ system was the easiest to use and produced the most flexible and strong green tapes.

Subsequent to screening, the slurries were compared in more detail. Low-binder versions of the methylcellulose and MSB1-13™ slurries were produced to determine if there was a trade-off between green properties and final properties, e.g., if a lower binder content produces a weaker tape but with higher sintered density.

The mechanical integrity was characterized using a bend test around rods of various diameters. Both the methylcellulose and MSB1-13™ systems demonstrated much greater flexibility and strength than either ethylcellulose or PVB. Methylcellulose tapes would break around 2 mm or 3 mm diameter rods while the MSB1-13™ tapes showed exceptional mechanical properties and could be folded in half without cracking. The ethylcellulose tapes were much less flexible and cracked around rods less than 10 mm in diameter. The PVB tapes could not bend around the largest 14 mm diameter rod.

In general, as tapes progressed through the processing to the final sintered Al-LLZO sheet, the differences between the binder systems were reduced. As part of this processing, tapes were laminated into stacks of four layers in order to produce thicker ceramic sheets which were more easily handled for analysis and would be more representative of the thicker bi-layer and tri-layer structures used for assembling solid state batteries. The as-cast oxide-only density of the tapes ranged widely from 30.3% (methylcellulose) to 38.0% (MSB1-13™), but the range for laminates was narrower, 40.2% to 44.6%. This narrower range for laminates is intuitive because the green tapes have similar ceramic-to-additive ratios but appear to have different residual porosities. The lamination process eliminated most of the residual porosity from the green tapes.

The final sintered density also appears to be weakly coupled to the observed green density of the observed laminates. For example, the low binder methylcellulose laminates were 4.4 percentage points more dense than standard methylcellulose laminates, but after sintering the difference is only 0.7 percentage points. The final sintered density for both compositions of MSB1-13™ tapes is notably less than the others at approximately 88%.

It is believed that the enhanced density of the methylcellulose, ethylcellulose, and PVB binder systems is due to water content in the solvents of those systems. In water, LLZO is known to protonate by exchanging $Li^+$ for $H^+$ ions and the $Li^+$ can then further react with $CO_2$ to produce $Li_2CO_3$. During sintering, the $Li_2CO_3$ decomposes, and the Li is returned to the LLZO lattice. This reaction or the additional transient $Li_2CO_3$ liquid phase produced by this reaction could explain the discrepancy in densification between the aqueous methylcellulose and solvent-based MSB1-13 systems. In the cases of ethylcellulose and PVB, it is possible that the ethanol and/or acetone could contain some amount of water contamination and produce a similar effect.

From the description herein, it will be appreciated that the present disclosure encompasses multiple implementations which include, but are not limited to, the following:

A method of fabricating lithium-garnet electrolyte (LLZO) tape structure, the method comprising: (a) forming a mixture of LLZO powder, a dispersant and at least one solvent; (b) milling the mixture with a milling media to produce a milled mixture; (c) adding a binder and a plasticizer to the milled mixture; (d) milling the binder, plasticizer and milled mixture to produce a LLZO slurry; (e) tape casting the LLZO slurry on a substrate to form a LLZO tape; and (f) sintering the LLZO tape.

The method of any preceding or following implementation, wherein the LLZO powder comprises a doped LLZO powder selected from the group consisting of Al-LLZO, Ga-LLZO, Ta-LLZO and Nb-LLZO.

The method of any preceding or following implementation, wherein the dispersant comprises at least one dispersant selected from the group consisting of Menhaden Fish Oil, DS002™, Poly(acrylic acid), Dispex Ultra PA 4560™, Hypermer KD6™, Hypermer KD7™ and ammonium polymethacrylate.

The method of any preceding or following implementation, wherein the solvent comprises at least one solvent selected from the group consisting of toluene, acetone, ethanol, isopropanol, ethylene glycol, water, water/ethanol and ethanol/toluene.

The method of any preceding or following implementation, wherein the mixture further comprises MgO.

The method of any preceding or following implementation, wherein the mixture further comprises a lithium salt selected from the group consisting of $Li_2CO_3$, LiCl, LiOH, $LiNO_3$ and $Li_2SO_4$.

The method of any preceding or following implementation, wherein the mixture further comprises a wetting agent.

The method of any preceding or following implementation, wherein the wetting agent comprises an agent selected from the group consisting of Dynol 604™, Triton X-100™, Dynol 360™, Dynol 810™, and Hydropalat WE 3650™.

The method of any preceding or following implementation, wherein the mixture further comprises a defoamer.

The method of any preceding or following implementation, wherein the binder comprises a binder selected from the group consisting of poly(vinyl alcohol), PVB, polyacrylic resins, WB4101™, ethylcellulose, MSB1-13™, xanthan gum, latex, polymethyl methacrylate, and methylcellulose.

The method of any preceding or following implementation, wherein the plasticizer comprises a plasticizer selected from the group consisting of polyethylene glycol (PEG 400), polyethylene glycol (PEG 300), glycerine, propylene carbonate, benzyl butyl phthalate, and dibutyl phthalate.

The method of any preceding or following implementation, further comprising removing air bubbles from LLZO slurry prior to tape casting.

The method of any preceding or following implementation, further comprising removing the binder from the cast LLZO tape; and sintering the LLZO tape after binder removal. The method of any preceding or following implementation, wherein said sintering the cast LLZO tape comprises sintering at a temperature in the range of about 1000° C. to about 1250° C. for period of in the range of 2 hours to 5 hours after removing the binder.

A method of fabricating lithium-garnet electrolyte (LLZO) tape structure, the method comprising: (a) forming a mixture of LLZO powder, a dispersant, a lithium salt, a wetting agent and at least one solvent; (b) milling the mixture with a milling media to produce a milled mixture; (c) adding a binder and a plasticizer to the milled mixture; (d) milling the binder, plasticizer and milled mixture to produce a LLZO slurry; (e) tape casting the LLZO slurry on a substrate to form a LLZO tape; (f) removing the binder from the cast LLZO tape; and (g) sintering the LLZO tape after binder removal.

The method of any preceding or following implementation, wherein the mixture further comprises a defoamer.

The method of any preceding or following implementation, wherein the mixture further comprises MgO.

The method of any preceding or following implementation, wherein lithium salt is a salt selected from the group consisting of $Li_2CO_3$, LiCl, LiOH, $LiNO_3$ and $Li_2SO_4$.

The method of any preceding or following implementation, further comprising laminating a plurality of LLZO tapes together to form a laminate LLZO tape; removing the binder from the laminate LLZO tape; and sintering the laminate LLZO tape after binder removal.

The method of any preceding or following implementation, further comprising removing air in the LLZO slurry with a vacuum chamber before casting LLZO slurry.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A method of fabricating lithium-garnet electrolyte (LLZO) tape structure, the method comprising:
   (a) forming a mixture of LLZO powder, MgO, a lithium salt selected from the group consisting of $Li_2CO_3$, LiCl, LiOH, $LiNO_3$ and $Li_2SO_4$, a wetting agent, a defoamer, a dispersant and at least one solvent;
   (b) milling the mixture with a milling media to produce a milled mixture;
   (c) adding a binder and a plasticizer to the milled mixture;
   (d) milling the binder, plasticizer and milled mixture to produce a LLZO slurry;
   (e) tape casting the LLZO slurry on a substrate to form a LLZO tape; and
   (f) sintering the LLZO tape.

2. The method of claim 1, wherein the LLZO powder comprises a doped LLZO powder selected from the group consisting of Al-LLZO, Ga-LLZO, Ta-LLZO and Nb-LLZO.

3. The method of claim 1, wherein the dispersant comprises at least one dispersant selected from the group consisting of Menhaden Fish Oil, DS002™, Poly(acrylic acid), Dispex Ultra PA 45601™, Hypermer KD6™, Hypermer KD7™ and ammonium polymethacrylate.

4. The method of claim 1, wherein the solvent comprises at least one solvent selected from the group consisting of toluene, acetone, ethanol, isopropanol, ethylene glycol, water, water/ethanol and ethanol/toluene.

5. The method of claim 1, wherein the wetting agent comprises an agent selected from the group consisting of Dynol 604™, Triton X-100™, Dynol 360™, Dynol 8101™, and Hydropalat WE 3650™.

6. The method of claim 1, wherein the binder comprises a binder selected from the group consisting of poly(vinyl alcohol), PVB, polyacrylic resins, WB41011™, ethylcellulose, MSB1-13™, xanthan gum, latex, polymethyl methacrylate, and methylcellulose.

7. The method of claim 1, wherein the plasticizer comprises a plasticizer selected from the group consisting of polyethylene glycol (PEG 400), polyethylene glycol (PEG 300), glycerine, propylene carbonate, benzyl butyl phthalate, and dibutyl phthalate.

8. The method of claim 1, further comprising removing air bubbles from LLZO slurry prior to tape casting.

9. The method of claim 1, further comprising:
   removing the binder from the cast LLZO tape; and
   sintering the LLZO tape after binder removal.

10. The method of claim 9, wherein said sintering the cast LLZO tape comprises sintering at a temperature in the range of about 1000° C. to 1250° C. for period of in the range of 2 hours to 5 hours after removing the binder.

11. A method of fabricating lithium-garnet electrolyte (LLZO) tape structure, the method comprising:
- (a) forming a mixture of LLZO powder, a dispersant, a lithium salt selected from the group consisting of $Li_2CO_3$, LiCl, LiOH, $LiNO_3$ and $Li_2SO_4$, a wetting agent, MgO and at least one solvent;
- (b) milling the mixture with a milling media to produce a milled mixture;
- (c) adding a binder and a plasticizer to the milled mixture;
- (d) milling the binder, plasticizer and milled mixture to produce a LLZO slurry;
- (e) removing air in the LLZO slurry to prevent pin holes;
- (f) tape casting the LLZO slurry on a substrate to form a LLZO tape;
- (g) removing the binder from the cast LLZO tape; and
- (h) sintering the LLZO tape after binder removal.

12. The method of claim 11, wherein the mixture further comprises a defoamer.

13. The method of claim 11, wherein the LLZO powder is selected from the group consisting of Al-LLZO, Ga-LLZO, Ta-LLZO and Nb-LLZO.

14. The method of claim 11, further comprising:
laminating a plurality of LLZO tapes together to form a laminate LLZO tape;
removing the binder from the laminate LLZO tape; and
sintering the laminate LLZO tape after binder removal.

* * * * *